Patented June 7, 1938

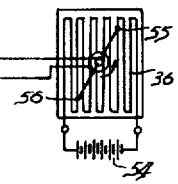
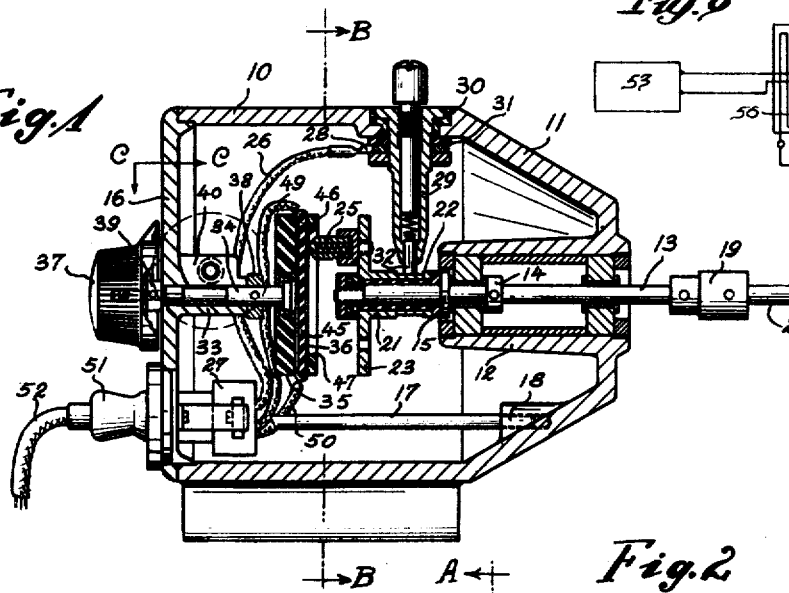
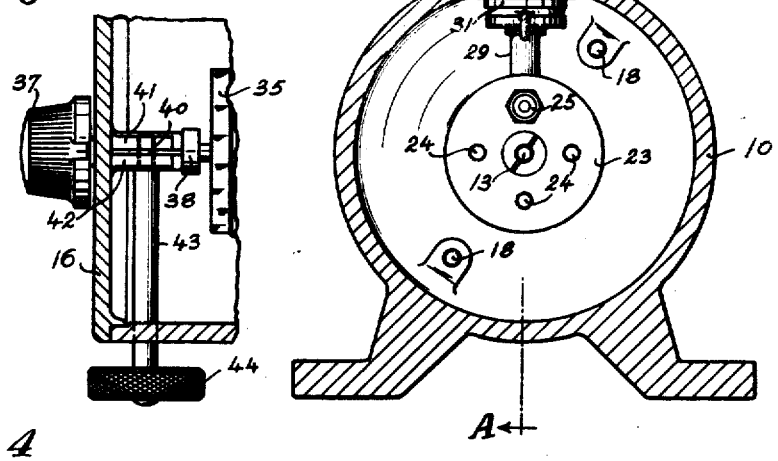
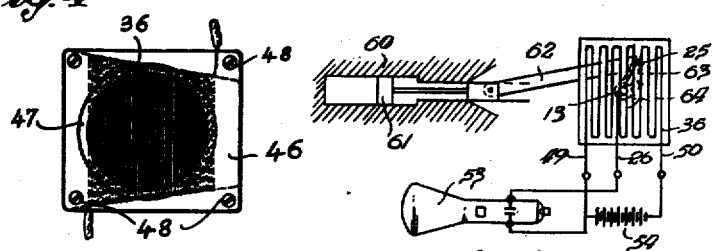

2,120,100

UNITED STATES PATENT OFFICE 2,120,100

INDICATOR DEVICE

Hans Illgen, Dresden-A, Germany, assignor to Zeiss Ikon Aktiengesellschaft, Dresden, Germany Application October 26, 1934, Serial No. 750,210
In Germany December 4, 1931

1 Claim. (Cl. 201—48)

The invention relates to the art of indicator devices for taking piston-pressure-time diagrams of power engines and particularly relates to improvements in electrical indicator devices adapted for recording the working diagram of an engine at a remote place.

In order to study the internal working cycle for a power engine it is customary to take an indicator diagram in which the position of the piston at any one instant is represented by the length of the abscissa while the pressure at any one instant or in any position of the piston is represented by the length of the ordinate.

It is now an object of the invention to provide novel means for transmitting the piston movement of the engine electrically to a remotely arranged indicator device. For this purpose the invention contemplates the employment of a device by means of which the piston controls an electric current of varying potential or density which is used for recording the piston movement in the indicator.

Another object of the invention is to provide a recording device which is adapted particularly for high-speed engines, for instance, internal combustion engines having a speed up to 3000 R. P. M.

A still further object of the invention is to provide a recording device of the type referred to with one or more electrical contact elements which are rotated by the engine whose indicator diagram is to be taken, and which contact elements slide in a circular path over a plane surface containing the windings of a stationary resistance wire, which is energized by a source of electric current. The rotating contact or contacts cause a variation of the resistance in the circuit and the varying current or potential produced thereby is used for operating the indicator device.

Another object of the invention is to employ in the recording device a stationary resistance composed of resistance wire whose windings are substantially composed of straight sections which are parallel to each other and form a substantially plane surface over which a contact driven by the engine to be tested slides in a circular path. The arrangement of the resistance is such, that the resistance variations of the circuit connected with the indicating means correspond to the projection of the contact points in this circular path onto a straight line which extends at a right angle to the direction of the resistance wires.

It is also an object of the invention to provide an electrical circuit with a device for producing resistance variations of any desired shape of curve, particularly for the remote recording of working cycles in power engines.

The invention is shown, by way of illustration and not of limitation in the accompanying drawing, in which Figure 1 is a vertical longitudinal section of the actuating assembly of the device substantially on the line A—A of Figure 2, Figure 2 is a vertical cross-section of the same, substantially on the line B—B of Figure 1, viewed in the direction of the arrows, Figure 3 is a detail section substantially on the line C—C of Figure 1, Figure 4 is a view of the assembled resistor unit, Figure 5 illustrates diagrammatically the operation of the device in connection with a power engine to be tested, and Figure 6 shows diagrammatically another embodiment of the device of the invention.

The device as shown in the Figures 1 to 4 comprises a casing 10 having at one end a conical extension 11 provided with a bearing 12 for supporting a shaft 13 which is provided with collars 14 and 15 for preventing axial movement of the shaft. The other end of the casing 10 is closed by a removable wall 16 which is held in position by tie bolts 17, of which only one is shown in Figure 1, and which are secured into threaded sockets 18 on the inner wall of the conical extension 11.

The other end of the shaft 13 is connected by a coupling 19 with one end of a flexible shaft 20 the other end of which is adapted to be connected with the crank shaft 64 of a power engine 60 (Fig. 5) whose indicator diagram is to be taken. In this manner the shaft 13 is driven with the same angular speed as the crank shaft of the power engine.

On the inner end of the shaft 13 is rigidly secured a contact carrier 21, which is electrically insulated from said shaft 13 by a bushing 22 of insulating material. The contact carrier 21 is provided with a circular disk 23 having a number of threaded openings 24 adapted to receive selectively a support for a contact member 25 which is yieldingly pressed at its pointed end against a stationary resistance to be presently described.

In order to connect the contact member 25 conductively with the remotely arranged indicator device, a conductor 26 leads from a triple plug socket 27 in the removable wall 16 to a terminal 28 mounted on a flanged sleeve 29 which is secured to the wall of the casing 10 by means of a bushing 30 and a washer 31 of insulating material. A spring controlled pin 32 at the inner end of this holder sleeve 29 engages the bushing portion of the contact carrier 21 to maintain a continuous conductive connection with the latter while it rotates.

The inner face of the removable wall or cover 16 is provided with an axial extension 33 in which is mounted a shaft 34 that carries on its inner end an insulating plate 35 with a resistance structure mounted thereon, while the other end of shaft 34 projects outwardly from the cover 16 and has attached thereto a knob 37 for rotatably adjusting the shaft 34. Collars 38 and 39 on the shaft 34 prevent axial displacement of the same. The extension 33 has a lateral enlargement which is radially slotted as shown at 40 to provide two spaced lugs 41 and 42, which are traversed by a screw 43 in such manner that the lugs may be drawn together, thereby clamping the shaft 34 in its adjusted position. The shank of the screw 43 extends outwardly of the casing and its outer end is provided with a knurled knob 44.

The resistance structure is formed of a suitable resistor wire 36 which is closely wound upon a solid insulating plate 45 of slate or the like. Adjacent windings of this wire are insulated from each other by an oxide or a film of lacquer and in their entirety they form a substantially plane surface over which the rotatable contact 25 is moved in a circular path with its pointed end in successive engagement with the windings, so as to establish a conductive connection with the same where the wire is bare.

The resistor unit thus formed is clamped upon the outer face of the insulating plate 35 by another insulating plate 46. The latter has a circular central aperture with a beveled rim 47 and it is attached to the plate 35 by a number of screws 48 or any other fastening means. The central aperture, of course, is provided for the purpose of presenting the straight sections of the resistor wire to the action of the rotating contact member 25. The two ends of the resistance 36 are connected by conductors 49 and 50 respectively with the two other contacts of the triple plug socket 27. A triple plug 51 to which a three-conductor cable 52 is attached provides a releasable connection with the conductors 26, 49 and 50. The cable 52 is adapted to connect these conductors with the recording device 53 which may be arranged at any convenient place. The recording device 53 may be of any desired construction and for example may contain a Braun tube as shown in Figure 5.

In Figure 5 the power engine to be tested is diagrammatically indicated at 60; its piston 61 is connected by the customary cross-head and connecting rod 62 with the crank 63 of the crankshaft 64. The flexible shaft 20 of the device of the invention is connected with the crankshaft 64 in such manner that the crank 63 and the rotatable contact member 25 rotate at the same angular velocity. In order to establish a proper angular relation between the piston and the contact member, the following provisions for adjustment are made. If necessary the contact structure may be removed from its threaded aperture and screwed into another one of the threaded apertures 24 of the disk, which constitutes a coarse adjustment. Furthermore, care must be taken, that the contact structure in the dead center positions of the piston comes to lie in a line which passes through the center of the axis of rotation and extends at a right angle to the resistance wires. This final adjustment may be accomplished by loosening the clamping screw 43 and then turning the shaft 34 by means of the knob 37 until this relation of the resistance wire to the contact structure is attained and then the shaft 34 is tightened again by the clamping screw 43.

From the above description of the device it is apparent, that the voltage measured between the conductors 26 and 49 (Fig. 5) varies when the pointed contact member 25 moves in a circle over the resistance 36. This voltage between the starting end of the resistance 36 and the pointed contact member 25 varies in the same manner as if the cotact 25 would make a movement which would be a projection of the circular movement onto a straight line which extends at a right angle to the direction of the straight portions of the resistance wire. This projection of the circular movement, however, is a sinusoidal wave line as shown in Figure 9. The rotating movement of the contact 25 therefore causes a sine-shaped voltage variation between one terminal of the resistance 36 and the pointed contact member 25.

Fig. 6 illustrates another embodiment of the invention, wherein in place of the single rotating contact member of Figures 1 to 5 two diametrically opposed contact members 55 and 56 are provided which are electrically insulated from each other. These contact members are rotated over the resistance 36, and the potential between these contacts is used for operating the recording device 53. This arrangement has the advantage that a pure alternating current may be produced which is devoid of any direct current component.

I claim:

In a device of the character described, including an electric circuit, a wire resistance in said electric circuit mounted on a stationary flat support to present serially connected straight wire sections which are parallel to each other, a carrier, two diametrically opposed contact members mounted on said carrier and insulated from each other, means for continuously rotating the carrier with uniform speed to move said contact members in circular paths over the straight wire sections of said resistance, whereby the potential between said contact members is varied substantially along a sinusoidal curve.

HANS ILLGEN.